United States Patent
Ando (10) Patent No.: US 6,336,663 B1
(45) Date of Patent: Jan. 8, 2002

(54) DEVICE FOR ADJUSTING SHOULDER ANCHOR HEIGHT

(75) Inventor: Takayuki Ando, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/629,056

(22) Filed: Jul. 31, 2000

(30) Foreign Application Priority Data

Aug. 2, 1999 (JP) .......................................... 11-218817

(51) Int. Cl.[7] .............................................. B60R 22/20
(52) U.S. Cl. ..................... 280/801.2; 280/808; 297/483
(58) Field of Search .......................... 280/801.1, 801.2, 280/808; 297/483

(56) References Cited

U.S. PATENT DOCUMENTS 4,917,403 A * 4/1990 Gyoda et al. ............... 280/808
5,205,588 A * 4/1993 Yamaoka et al. ......... 280/801.2
5,725,248 A * 3/1998 Inoue et al. .............. 280/801.2

FOREIGN PATENT DOCUMENTS

| EP | 566774 A1 | * 10/1993 | ............. 280/801.2 |
| GB | 2 247 608 A | * 3/1992 | ............. 280/801.2 |
| JP | 2000168494 A | * 6/2000 | |

* cited by examiner

Primary Examiner—Lanna Mai
Assistant Examiner—Ruth Ilan
(74) Attorney, Agent, or Firm—Nixon Peabody LLP; Thomas W. Cole (57) ABSTRACT

A device for adjusting height of a shoulder anchor that forms a seat belt device of a vehicle. A buffer member is provided between a slider to which a shoulder anchor is attached, and a guide rail secured to a vehicle body. A pin for restricting the movement in a vertical direction of the slider, is guided by a guide wall to move from one recess portion in the buffer member to the other. The guide wall has ribs as reinforcing members on a lower side and the ribs prevent deformation of the guide wall.

20 Claims, 8 Drawing Sheets

DEVICE FOR ADJUSTING SHOULDER ANCHOR HEIGHT

BACKGROUND OF THE INVENTION

1. Field of the Invention

The present invention relates to a device for adjusting height of a shoulder anchor which forms, for example, a seat belt apparatus of a vehicle.

2. Description of the Related Art

In a seat belt apparatus for constraining with a long belt-shaped webbing belt a body of a vehicle occupant sitting on a seat, a winding device for winding the webbing belt is disposed in the vicinity of a lower end portion of a center pillar of the vehicle. The webbing belt is pulled upward along the center pillar and turned down as it passes through a shoulder anchor mounted in the vicinity of an upper end portion of the center pillar. A distal end portion of the webbing belt is anchored to an anchor plate provided in the vicinity of a seat portion of the seat.

The webbing belt passes through a tongue between the anchor plate and the shoulder anchor. The seat belt apparatus is constituted in such a manner that the webbing belt is attached by the vehicle occupant gripping the tongue, pulling the webbing belt and causing the tongue to be held in a buckle device provided in the vicinity of the seat.

Of the devices and members which constitute the seat belt apparatus having the above constitution, the shoulder anchor can be formed to be slidable within a predetermined range along the center pillar with a device for adjusting height of a shoulder anchor, which device likewise forms a seat belt apparatus. As a consequence, a turning down position of the webbing belt can be adjusted.

The device for adjusting shoulder anchor height includes a plate-shaped guide rail secured to the vicinity of the upper end portion of the center pillar with a bolt or the like in a state in which the longitudinal direction of the guide rail runs substantially along the vertical direction of the vehicle, and a slider which is slidably attached along the longitudinal direction of the guide rail in a state in which the slider grips both end portions of the guide rail in the width direction thereof. The above shoulder anchor is anchored to this slider. The slider is provided with a cover and a lock pin is provided thereinside.

A plurality of lock holes are formed in the guide rail along the longitudinal direction thereof. An inner circumference portion of each lock hole restricts movement of the lock pin along a sliding direction as a result of entry of the lock pin, which projects from the slider, thereby restricting sliding of the slider. In other words, the height of the shoulder anchor can be adjusted by allowing the lock pin to enter into one of the plurality of lock holes.

Furthermore, in order to prevent generation of an impact sound, which is generated at a time of sliding of a main body of the slider or at a time of collision of the main body of the slider with the guide rail caused by vibrations generated by the running vehicle, and in order to prevent generation of a scraping sound, which is generated at a time of sliding movement of the lock pin on the guide rail, a sheet formed of synthetic resin material is attached to the guide rail.

Indentations are formed in the sheet in correspondence with the lock holes. The indentations enter the lock holes in a state in which the sheet is attached to the guide rail. A portion at an upper side of an inner circumference portion of each indentation serves as a guide portion. An end portion of the guide portion at an open side of the indentation is located substantially at the same position as a surface of the sheet. An opposite end portion of the guide portion serves as an inclined surface located substantially at the same position as an inner bottom portion of the indentation. In a state in which the lock pin enters the lock hole, when the main body of the slider is raised, the lock pin is guided by the guide portion. Thus, the lock pin is moved toward the surface side sheet. Thereafter, the lock pin slides on the surface of the sheet. Consequently, even in the state in which the lock pin has entered the lock hole, the slider can be raised. Movement of the slider is substantially limited only in a downward direction. (In a case wherein the device for adjusting the height of the shoulder anchor is to be lowered in the state in which the movement is limited, it is necessary to perform a releasing operation by depression of a button or the like which is separately provided.)

The device for adjusting shoulder anchor height has a structure in which a pin is formed on the sheet, the pin is heat welded to the guide rail in a state in which the pin passes through the guide rail, and the diameter is enlarged and caulked, thereby securing the sheet to the guide rail.

In such heat welding and caulking, time is required to heat the pin, and time is required for cooling after caulking, which reduces work efficiency and thereby constitutes a factor hindering reduction of manufacturing costs.

Also, because the sheet is formed of synthetic resin material, when the lock pin rides up on the guide portion, the guide portion is bent by a load from the lock pin. Thus, there is a possibility that the lock pin cannot be smoothly guided. In order to solve this problem, a tongue-like support piece extends from the inner circumference of the lock hole, and the guide portion is supported by this support piece.

However, if a gap occurs between the support piece and the guide portion after the sheet is assembled onto the guide rail, the guide portion will be bent by the lock pin load. Thus, in order not to form a gap of more than a predetermined size between the support piece and the guide portion, it is necessary to manufacture both the support piece and the guide portion with strict size control, which constitutes a factor hindering reduction of manufacturing costs.

Hence, in a slider and a sheet having a conventional structure, much remains to be improved in view of cost reduction.

In consideration of the above facts, an object of the present invention is to provide a device for adjusting shoulder anchor height, the device being provided with a buffer member such as a sheet or the like which effectively enables a reduction of manufacturing costs.

SUMMARY OF THE INVENTION

In a first aspect of the present invention, there is provided a device for adjusting shoulder anchor height of a seat belt assembly in a vehicle, the device comprises a guide member securable to a vehicle having a seat belt assembly with a shoulder anchor, a slider adapted for connection to the shoulder anchor, the slider being engaged with the guide member and slidable therealong, an engaging member attached to one of the slider and the guide member and engaging with the other of the slider and the guide member to thereby fix a position of the slider and the guide member relative to one another, a buffer member having a main body, the main body being mounted on said other of the slider and the guide member, and having an inclined surface with a lower side, the buffer member being interposed between the engaging member and the other of the slider and the guide member, and a reinforcing rib integrally provided at the main body on the lower side of an inclined surface portion which guides the engaging member in a direction opposite to an engaging direction of the engaging member when the slider moves.

In a second aspect of the present invention, there is provided a device for adjusting shoulder anchor height of a seat belt assembly in a vehicle, the device comprises a guide member securable to a vehicle having a seat belt assembly with a shoulder anchor, a slider adapted for connection to the shoulder anchor, the slider being engaged with the guide member and slidable therealong, an engaging member attached to the slider which engages with the guide member to thereby fix a position of the slider and the guide member relative to one another, a buffer member having a main body attached to the guide member and interposed between the engaging member and the guide member, the main body having an inclined surface portion with a lower side, reinforcing ribs integrally provided at the main body on the lower side of the inclined surface portion which guide the engaging member in a direction opposite to an engaging direction of the engaging member when the slider moves, and a recess portion provided continuously from the inclined surface for allowing the engaging member to enter thereinside for providing engagement, the engaging member urged toward the bottom surface of the recess portion of the main body by a spring.

In a third aspect of the present invention, there is provided a device for adjusting shoulder anchor height of a seat belt assembly in a vehicle, the device comprises a slider on which is mounted a shoulder anchor, a guide member for guiding the shoulder anchor, a lock pin in the slider, which lock pin engages with a lock hole which is formed along the longitudinal direction of the guide member, a buffer member which is disposed at the inner perimeter of the lock hole, a recess portion and an inclined surface portion which are provided on the buffer member, and a reinforcing section which is integrally provided with the buffer member on a lower surface of the inclined surface portion.

The device for adjusting shoulder anchor height having the above structure is provided with a guide portion corresponding to a lock hole into which the engaging portion enters. The engaging member is guided by the inclined surface of the guide member to leave the lock hole when the slider slides, as a result of the engaging member riding up on the inclined surface of the guide portion.

Here, because a rib section is formed on the guide portion, the guide portion does not bend when a load or the like from the engaging member acts on the guide portion. Consequently, the guide portion can maintain an original configuration, and the engaging member can be smoothly guided.

Moreover, because the rib section for reinforcing the guide portion is integrally formed at the guide portion, a gap is not formed, unlike a conventional guide member and support piece. Consequently, strict size control is not required for forming the buffer member and whichever of the slider and the guide rail the buffer member is attached to. Hence, the manufacturing cost of the device for adjusting shoulder anchor height can be reduced.

DESCRIPTION OF THE PREFERRED EMBODIMENTS

Figure 1:
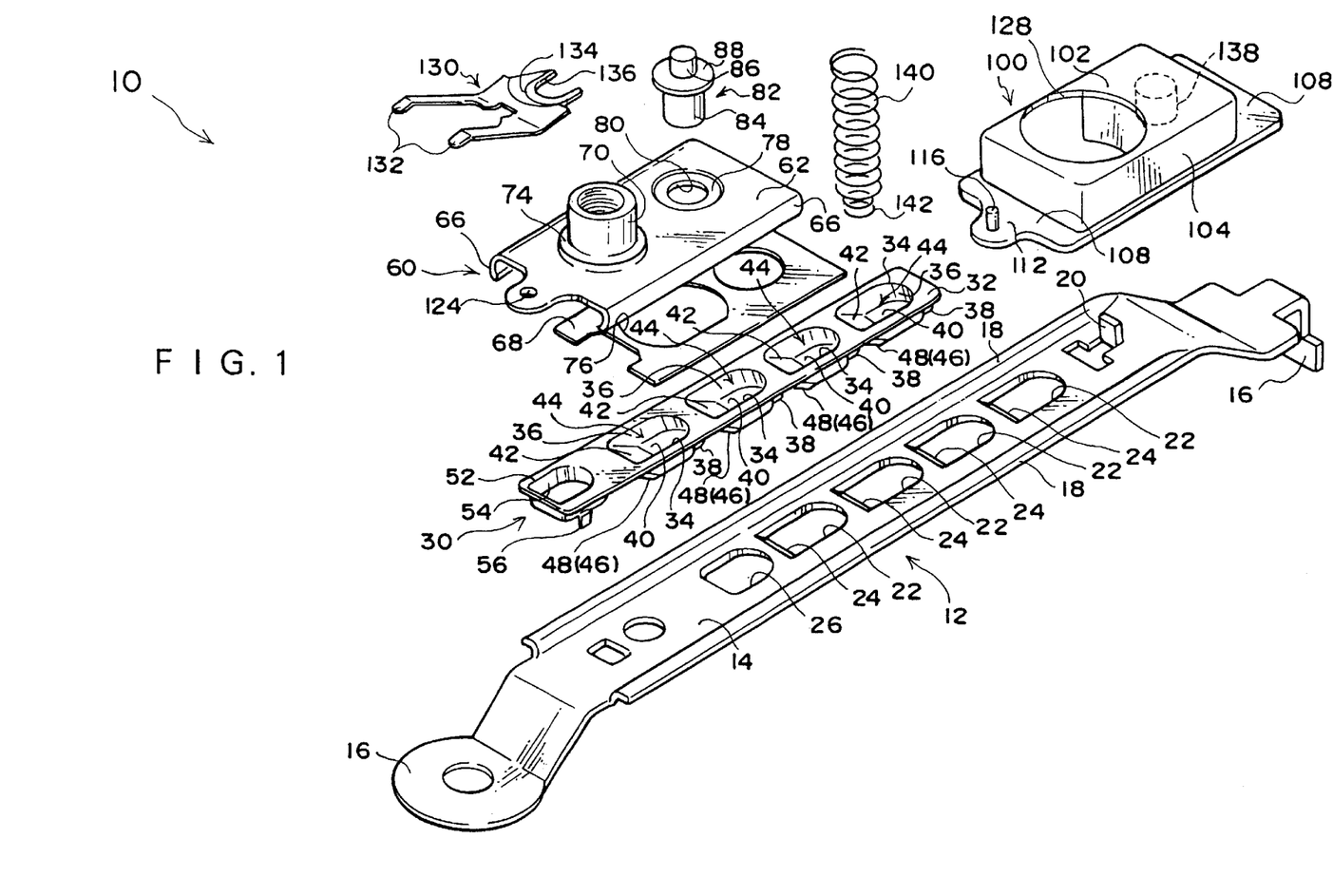
FIG. 1 is an exploded perspective view of a device for adjusting shoulder anchor height according to one embodiment of the present invention.

FIG. 1 is an exploded perspective view showing a structure of a device 10 for adjusting shoulder anchor height according to one embodiment of the present invention.

Structure of Guide Rail 12

As shown in FIG. 1, the device 10 for adjusting shoulder anchor height includes a guide rail 12 formed of iron or the like. The guide rail 12 is provided with a rectangular rail body 14. The rail body 14 is disposed in the vicinity of an upper end portion of a center pillar (not shown in the drawings) in a state in which a longitudinal direction of the rail body 14 runs substantially along a vertical direction of the center pillar. Attaching portions 16, formed at both end portions of the guide rail 12 in the longitudinal direction, are secured to a vehicle. At each end portion of the rail body 14 in a width direction thereof, a rail portion 18, which extends in an inclined manner toward one side in a direction of thickness of the rail body 14 and outside of the width direction of the rail body 14, is continuously formed along the longitudinal direction of the rail body 14.

Strictly speaking, the rail body 14 is curved, with the center of curvature being a position separated by a predetermined distance from one surface of the rail body 14 in the thickness direction thereof. The result is that the strength of the rail body 14 is set to such a degree that only an external force of more than a predetermined value acting from one side in the thickness direction of the rail body 14 can deform the rail body 14. The degree of curvature does not substantially affect sliding movement of a slider 60, which is described later.

A stopper 20 is formed on one side of one longitudinal direction end of the rail body 14, substantially at the center of the width direction thereof. The stopper 20 is formed by cutting and raising a part of the rail body 14 toward one side in the thickness direction thereof. When one longitudinal direction end portion of the slider 60, described later, contacts the stopper 20, sliding of the slider 60 in the longitudinal direction is limited.

Toward another longitudinal direction end of the rail body 14 from the stopper 20, a plurality of lock holes 22 (four lock holes in this embodiment) are formed at predetermined intervals along the longitudinal direction of the rail body 14. Each of the lock holes 22 is a long hole having a long side along the longitudinal direction of the rail body 14. A longitudinal direction end portion at an one end of each lock hole 22 (that is, the side toward the stopper 20) is formed as a recessed shape open toward the other longitudinal direction end of the rail body 14 and in a semi-circular shape having a diameter substantially equal to the width of the lock hole 22.

Figure 2A:
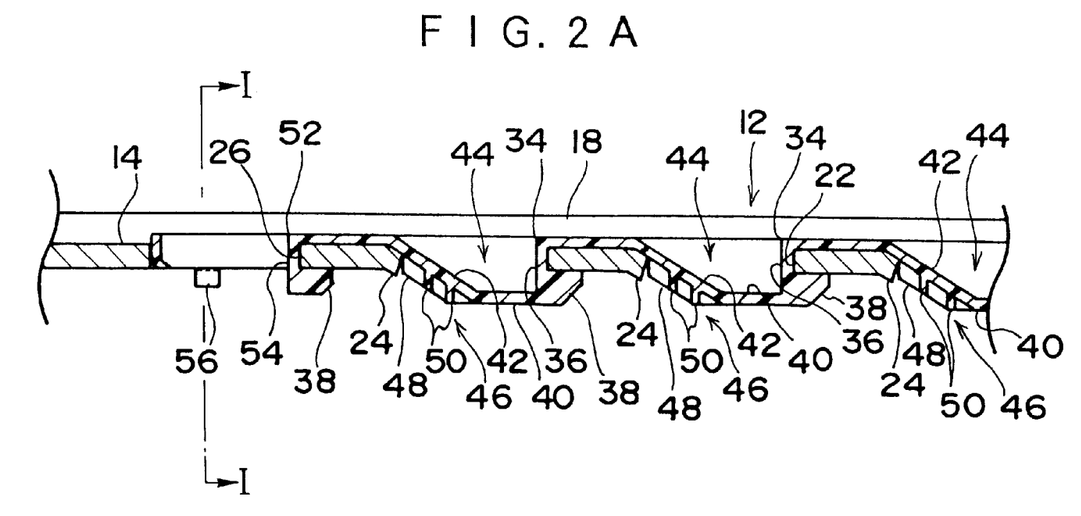
FIG. 2A is a sectional view of a guide rail and a sheet.
Figure 2B:
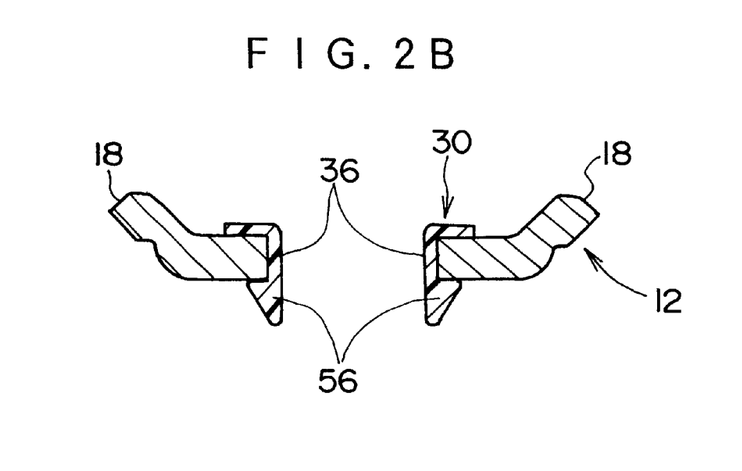
FIG. 2B is a sectional view of the guide rail and the sheet taken along line 1—1 of FIG. 2A.
Figure 3:
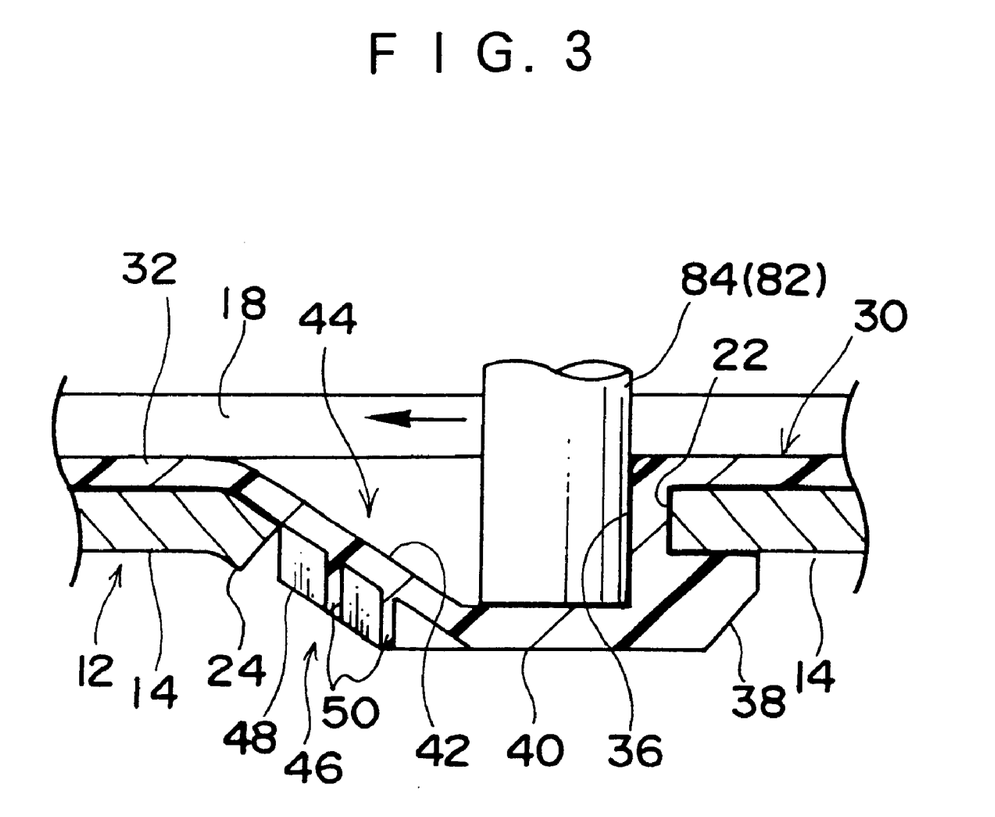
FIG. 3 is a partially enlarged sectional view of the guide rail and the sheet.

On the other hand, an end portion at the other longitudinal direction end of the lock hole 22 is a straight-line configuration substantially orthogonal to the longitudinal direction of the lock hole 22. A contact piece 24 is formed at an other longitudinal direction end portion of the lock hole 22. As shown in FIGS. 2A and 2B, the contact piece 24 has an inclined surface along the thickness of the rail body 14. At one end of the contact piece 24, the inclined surface is flush with an upper surface of the rail body 14. At the other end, the contact piece 24 is displaced below the upper surface of the rail body 14. The thickness of this contact piece 24 is substantially the same as the thickness of the rail body 14. Consequently, where the contact piece 24 is formed in the rail body 14, an inclined surface is also formed at the lower surface of the rail body 14.

Furthermore, as shown in FIGS. 1, 2A and 2B, an assembly hole 26 is formed at a location further toward the other longitudinal direction end portion of the rail body 14 than the lock hole 22 located further toward the other longitudinal direction end of the rail body 14. Although a longitudinal length of the assembly hole 26 is shorter than a longitudinal length of the lock holes 22, a width of the assembly hole 26 is the same as the width of the lock holes 22. The assembly hole 26 is the same as the lock holes 22 in that an end portion thereof at the side of the one longitudinal direction end has a substantially semi-circular configuration while another end portion in the longitudinal direction has a straight-line configuration along the width direction. However, as described above, a contact piece 24 is formed at the other longitudinal direction end portion of each lock hole 22, but no contact piece 24 is formed at the other longitudinal direction end portion of the assembly hole 26.

Structure of Sheet 30

A peripheral wall 54 of a sheet 30, which serves as a buffer member, enters the assembly hole 26. The sheet 30 is formed of, for example, a synthetic resin material such as polypropylene or the like. In this embodiment, polypropylene is primarily used for the sheet 30. The sheet 30 may be formed of another synthetic resin material but, by using polypropylene, a material cost is cheaper than that of an elastomer-formed sheet of a conventional device for adjusting height of a shoulder anchor.

The sheet 30 formed of such synthetic resin material is provided with a sheet main body 32 which serves as a "main body of the buffer member". The sheet main body 32 is substantially formed in a substantially rectangular plate-shaped configuration. In a state in which the sheet main body 32 is assembled into the above guide rail 12, a longitudinal direction of the sheet 30 substantially runs along the longitudinal direction of the rail body 14. In the sheet main body 32, a plurality of hole portions 34 are formed along the longitudinal direction of the sheet main body 32 at predetermined intervals corresponding to the intervals of the lock holes 22.

A longitudinal direction one end portion of each of the hole portions 34 has a substantially semi-circular configuration, in the same manner as the lock holes 22, while another longitudinal direction end portion of the hole portion 34 is formed in a straight-line configuration along the width direction. On one thickness direction surface of the sheet main body 32, a peripheral wall 36 having a substantially horseshoe-shaped configuration (a substantially U-shaped configuration) is formed along a peripheral edge of the hole portion 34. An outside width of the peripheral wall 36 is slightly smaller than the width of the lock hole 22. A radius of curvature of an outer circumference portion at a curved portion of the peripheral wall 36 is slightly smaller than a radius of curvature of the substantially semi-circular longitudinal direction one end portion of the lock hole 22. Consequently, these peripheral walls 36 can enter the lock holes 22 described above. Furthermore, an engaging piece 38 is formed on each of the peripheral walls 36. The engaging piece 38 is projectedly formed from the outer circumference portion of the curved portion of the peripheral wall 36 in the vicinity of an end portion of the peripheral wall 36, which is opposite, in the sheet main body 32 thickness direction the connection portion between the sheet main body 32 and the peripheral wall 36. An interval between the engaging piece 38 and the sheet main body 32 is slightly larger than the thickness of the rail body 14. In a state in which the peripheral wall 36 enters the lock hole 22 to such a degree that the curved portion of the peripheral wall 36 comes into contact with the one longitudinal direction end portion of the lock hole 22 (the end portion which is semi-circular), a portion of the rail body 14 in the vicinity of the lock hole 22 is sandwiched between the sheet main body 32 and the engaging piece 38.

At the end portion of the peripheral wall 36, which end portion is opposite, in the sheet main body 32 thickness direction, the connection portion between the peripheral wall 36 and the sheet main body 32, a bottom wall 40 is formed. A guide wall 42 which serves as a guide portion extends from an end portion of the bottom wall 40 which is at the opposite end from the curved portion of the peripheral wall 36. The guide wall 42 is connected to the same end portion and to the sheet main body 32 at an end portion of the guide wall 42 which is opposite from the connection portion between the guide wall 42 and the bottom wall 40. The bottom wall 40, the peripheral wall 36 and the guide wall 42 form a pin housing portion 44 that has a bottom.

Both surfaces of the guide wall 42 in a thickness direction are inclined with respect to one thickness direction surface of the sheet main body 32 to the same extent as inclination of the contact piece 24 with respect to the one thickness direction surface of the rail body 14. In the state in which the peripheral wall 36 enters the lock hole 22, another thickness direction side of the guide wall 42 comes into contact with the contact piece 24, in the vicinity of the connection portion between the guide wall 42 and the sheet main body 32, and is supported by the contact piece 24.

Figure 4A:
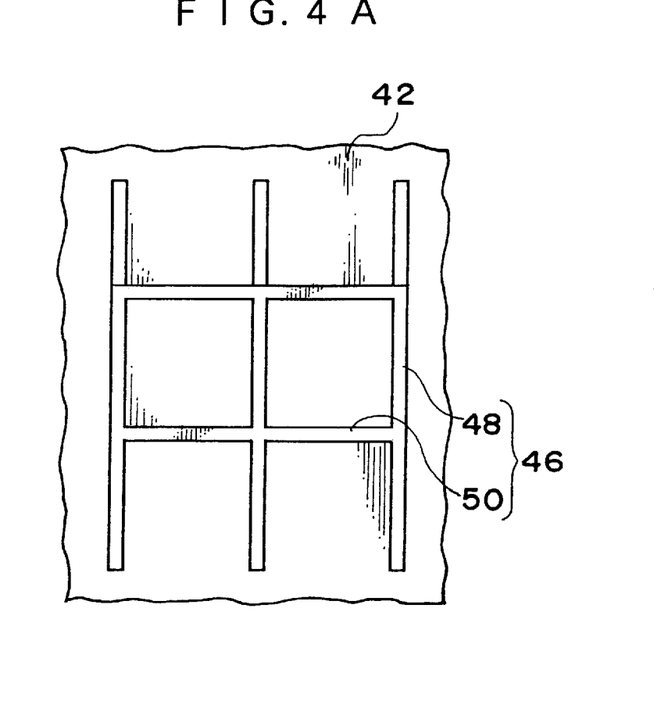
FIG. 4A is a plan view of a guide wall, the view showing a structure of a rib section.
Figure 4B:
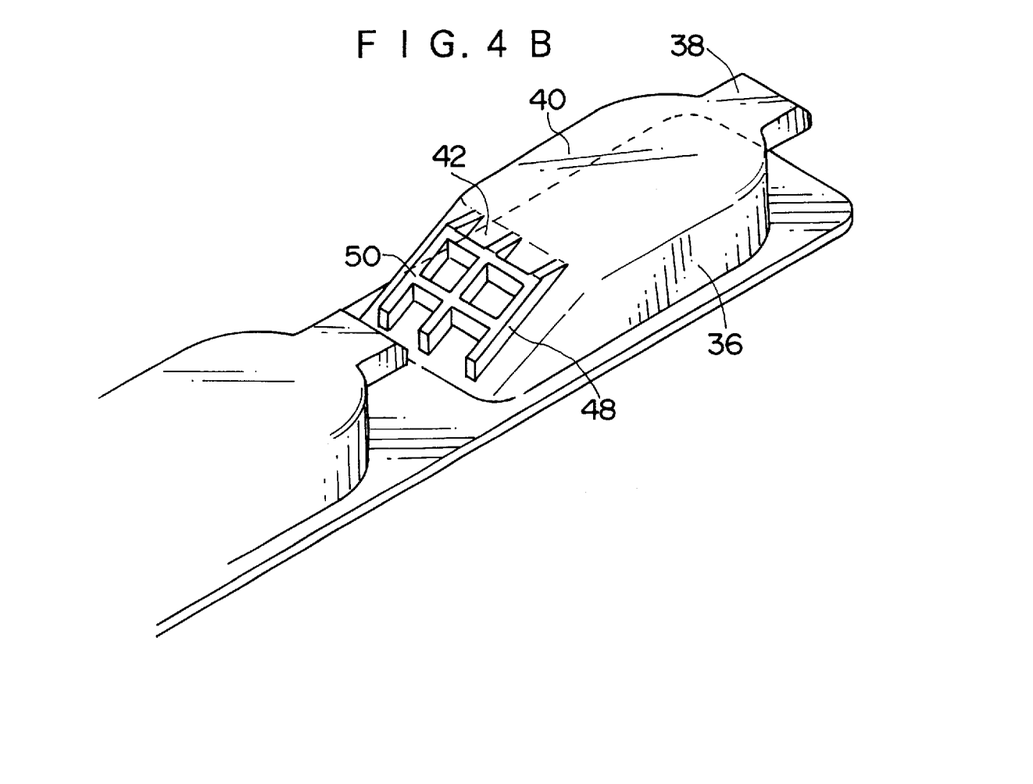
FIG. 4B is a perspective view of the rib section seen from a lower side of the sheet.

Furthermore, a rib section 46 is formed on another thickness direction surface of the guide wall 42. As shown in FIGS. 4A and 4B, the rib section 46 has a plurality of vertical ribs 48 (three vertical ribs in this embodiment) and a plurality of horizontal ribs 50 (two horizontal ribs in this embodiment). Each of the vertical ribs 48 has a longitudinal side substantially along the longitudinal direction of the sheet main body 32. The vertical ribs 48 are formed in parallel so as to face each other along the width direction of the sheet main body 32, and each end of each vertical rib 48 contacts the contact piece 24.

Each horizontal rib 50 has a longitudinal side substantially along the width direction of the sheet main body 32. The horizontal ribs 50 are formed in parallel so as to face each other along the longitudinal direction of the sheet main body 32. Furthermore, each of the horizontal ribs 50 intersects the vertical ribs 48 substantially at right angles, and the rib section 46 as a whole is formed substantially in a lattice-shaped configuration.

Furthermore, a hole portion 52 is formed in the sheet main body 32, further toward the other longitudinal direction end of the sheet main body 32 than the hole portion 34 that is furthest toward the same end (to be more exact, at a side corresponding to the longitudinal direction other end of the rail body 14 in the state in which the sheet 30 is assembled onto the guide rail 12). The longitudinal side of the hole portion 52 is along the longitudinal direction of the sheet main body 32. One end portion of the hole portion 34 is formed in a semi-circular configuration, which is a recessed shape that opens toward an opposite end of the hole portion 34, and which has a diameter which is substantially equivalent to a width of the hole portion 52.

A peripheral wall 54 is formed on one thickness direction surface of the sheet main body 32 along a peripheral edge of this hole portion 52. The peripheral wall 54 is formed in a substantially cylindrical configuration, unlike the peripheral walls 36. A longitudinal direction end portion of the peripheral wall 54, at the hole portion 34 side thereof, is curved in a semi-circular configuration having a diameter which is equivalent to the width of the hole portion 52. A longitudinal direction size, width and radius of curvature of the outside of peripheral wall 54 are respectively slightly smaller than the longitudinal direction size, width and radius of curvature of the assembly hole 26, and the peripheral wall 54 can penetrate into the assembly hole 26.

As shown in FIGS. 2A and 2B, an engaging piece 38 and a plurality of engaging hooks 56 which serve as engaging portions are projectedly and formed from an end portion of the peripheral wall 54, which is opposite, in the sheet main body 32 thickness direction, the connection portion of the peripheral wall 54 with the sheet main body 32. In the state in which the sheet 30 is assembled onto the guide rail 12, these engaging hooks 56 engage the surface on the other thickness direction side of the rail body 14 in the vicinity of the peripheral edge of the assembly hole 26, thereby preventing detachment of the peripheral wall 54 which passes through the assembly hole 26.

Structure of Slider 60

As shown in FIG. 1, on the above rail body 14, a slider 60 is attached which is formed of iron or the like. The slider 60 is provided with a rectangular portion 62 formed in a rectangular configuration having a length shorter than the rail body 14. At each end portion of this rectangular portion 62 in a width direction thereof, a grip portion 66 is formed which has a grip groove which is open toward the width direction inside of the rectangular portion 62. A spacing between the deepest portions of the grip grooves formed by the grip portions 66 is slightly wider than a spacing between outer portions of the pair of rail portions 18, and an opening size of each of the grip grooves is slightly wider than the thickness of the rail portions 18. Consequently, the slider 60 is formed in such a manner that each of the pair of rail portions 18 can enter one of the grip grooves which are formed by the grip portions 66, with the result that displacement of the slider 60 is restricted with respect to the rail body 14 along the width direction and the thickness direction of the rail body 14, and the slider 60 can be slid along the longitudinal direction of the rail body 14 while being guided by the rail portions 18 in this state.

At the slider 60, a plate 68 is provided which is formed of the same synthetic resin material as the sheet 30. The plate 68 is also formed in a plate-shaped configuration. End portions of the plate 68 at sides corresponding to the above grip portions 66 are curved in the same manner as the grip portions 66 and enter the grip grooves.

Figure 5:
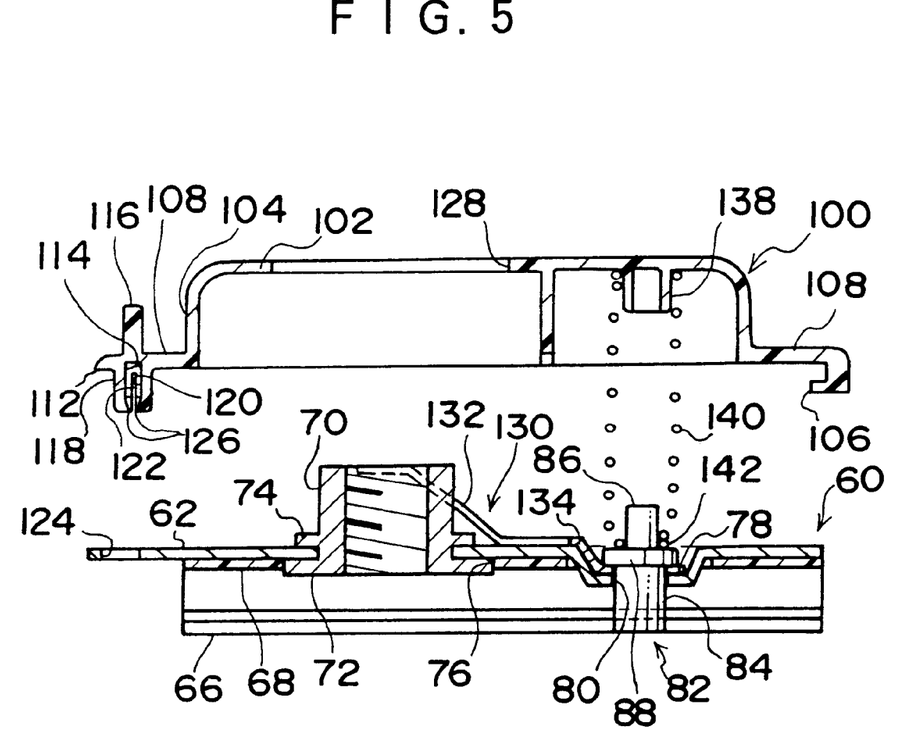
FIG. 5 is a sectional view of a slider and a cover, the view showing a state prior to insertion of an assembly projection into an assembly hole.
Figure 6:
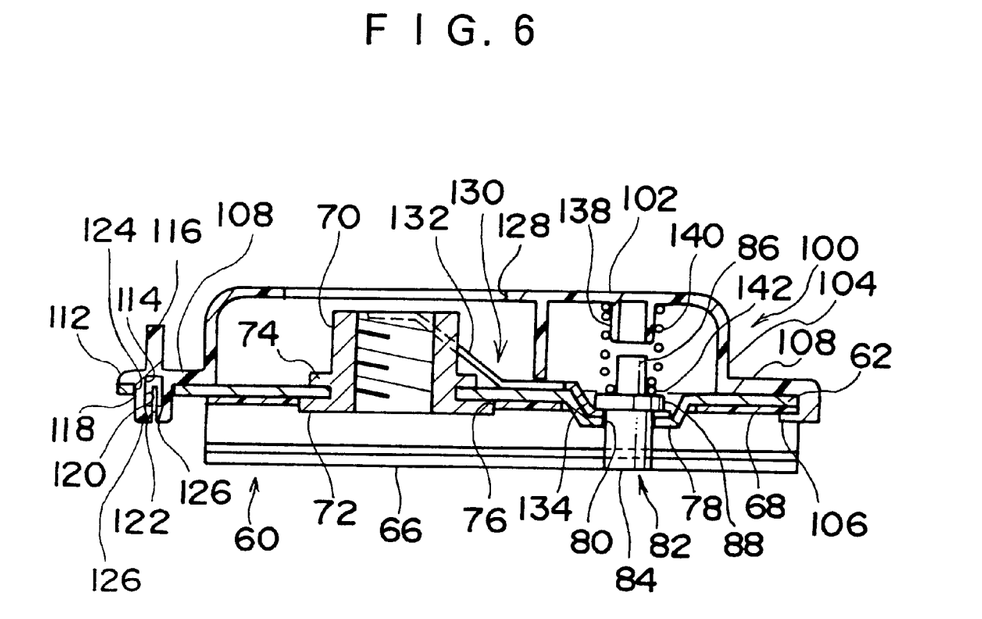
FIG. 6 is a sectional view of the slider and the cover, the view showing a state wherein the insertion of the assembly projection into the assembly hole has been performed.
Figure 7:
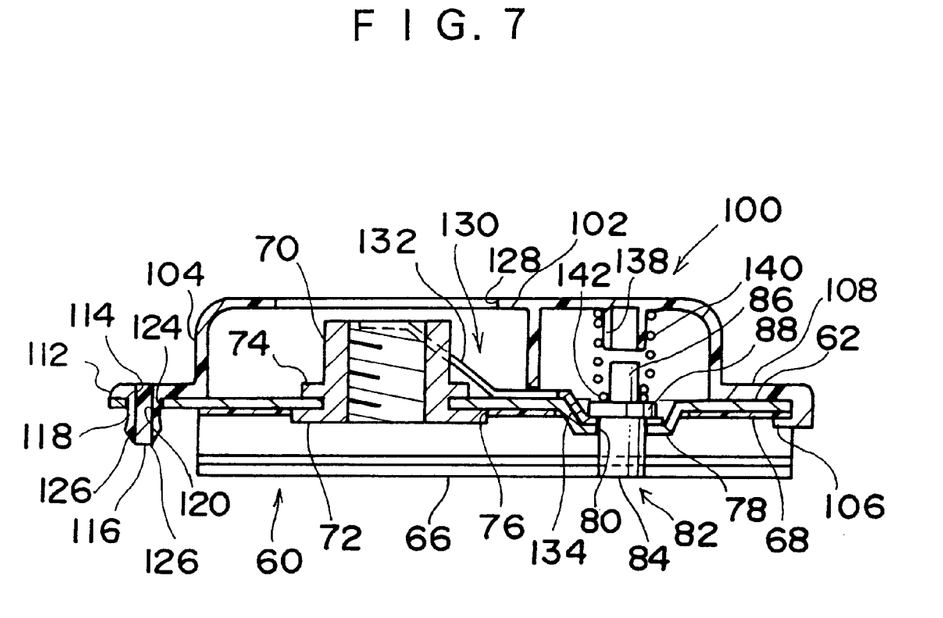
FIG. 7 is a sectional view of the slider and the cover, the view showing a state wherein the assembly projection has expanded in diameter in the assembly hole.

In the rectangular portion 62 of the slider 60, a through-hole is formed which passes through the rectangular portion 62 along a direction of thickness thereof. A cylinder body 70 passes through the through-hole. A female thread is formed on an inner circumference of the cylinder body 70. An unillustrated bolt or the like which passes through the shoulder anchor screws into the cylinder body 70. As shown in FIGS. 5 through 7, a plate-shaped base portion 72 is formed at one axial direction end of the cylinder body 70. Also, a flange portion 74 extends out from an outer circumference portion of the cylindrical portion 70 at a side opposite to the base portion 72 is formed with respect to the rectangular portion 62. The rectangular portion 62 is sandwiched between the base portion 72 and the flange portion 74, which serve as a temporary stopper for preventing detachment of the cylindrical body 70. Furthermore, the flange portion 74 is fixed and strongly secured to the rectangular portion 62 by welding or the like.

A hole portion 76 is formed in the plate 68 in correspondence with the base portion 72. Entry of the base portion 72 into the hole portion 76 limits displacement of the plate 68 with respect to the slider 60.

At the side of the cylindrical body 70, a step portion 78 is formed which is a recess open toward one thickness direction side of the rectangular portion 62. At this step portion 78, the one thickness direction surface is displaced further toward another thickness direction side than the one thickness direction surface of other portions of the rectangular portion 62. The step portion 78 is formed substantially in a circular configuration when seen in a plan view. At the center thereof, a circular through-hole 80 is formed. An inner diameter of the through-hole 80 has a size which is about the same as the inner width of the peripheral walls 36. When the slider 60 is guided to slide along the guide rail 12, a movement path of the through-hole 80 passes over the lock holes 22. A pin 82 which serves as an "engaging member" is attached such that the pin 82 passes through the through-hole 80.

The pin 82 has a large diameter portion 84 formed in a circular configuration having an outer diameter slightly smaller than the inner diameter of the through-hole 80, a small diameter portion 86 which serves as an engaging portion and is coaxially and integrally formed with respect to one axial direction end portion of the large diameter portion 84, and a plate-shaped flange portion 88 which extends radially outward from the one axial direction end portion of the large diameter portion 84. The large diameter portion 84 enters the through-hole 80 from one thickness direction side of the rectangular portion 62 and passes through the through-hole 80. However, detachment of the large diameter portion 84 to the other thickness direction side of the rectangular portion 62 is prevented by the flange portion 88. An outer diameter of the large diameter portion 84 of the pin 82 is smaller than the inner width of the outer peripheral walls 36. The large diameter portion 84 which passes through the through-hole 80 can enter the pin housing portions 44, which are each formed by a bottom wall 40, a peripheral wall 36, and a guide wall 42.

Structure of Cover 100

Further, as shown in FIG. 1, at the one thickness direction surface side of the rectangular portion 62, a cover 100 is provided which is formed of synthetic resin material. The cover 100 is provided with a substantially rectangular bottom portion 102. At an outer circumference portion of the bottom portion 102, a peripheral wall 104 is integrally formed. The cover 100 is formed overall in a box-shaped configuration having one open side in a depth direction thereof. From the open side (that is, an end portion at a side opposite to the bottom portion 102) of the peripheral wall 104, flange portions 108 extend outward from the peripheral wall 104. At an end portion of one flange portion 108, which faces one longitudinal direction side of the bottom portion 102, a hook-shaped engaging hook 106 (see FIGS. 5 through 7) is formed. In a state in which the cover 100 is assembled onto the slider 60, the engaging hook 106 engages so as to sandwich a part of a longitudinal direction end portion of the rectangular portion 62, which serves to limit displacement of the cover 100 with respect to the slider 60.

A projecting piece 112 having a substantially semi-circular configuration is formed from an end portion of a flange portion 108 corresponding to another longitudinal direction side of the bottom portion 102. As shown in FIGS. 5 through 7, a circular hole 114 is formed in the projecting piece 112, which hole passes through the projecting piece in a thickness direction thereof. A pin 116 which serves as a "diameter enlarging projection" is pressed into the circular hole 114 (see FIG. 7). Initially, this pin 116, as shown in FIG. 5, is integrally projectedly formed from the projecting piece 112 coaxially with the circular hole 114, so as to close the end portion of the hole portion 114 at the side of one thickness direction surface of the projecting piece 112. How this pin 116 is pressed into the hole portion 114 will be explained in detail later, and explanation thereof will be omitted here.

An assembly projection 118 is formed from another thickness direction surface of the projecting piece 112, along a peripheral edge of the hole portion 114. In the assembly projection 118 a through hole 120 is formed, which has an inner diameter substantially equal to the inner diameter of the hole portion 114. Slits 122, whose longitudinal direction is along an axial direction, are formed at two places such that the slits 122 face each other via a central axis of the through-hole 120. The notches are open at an end portion of the assembly portion 118 which is opposite an end portion at which a connection portion between the projecting piece 112 and the assembly portion 118 is provided.

In correspondence to this assembly projection 118, an assembly hole 124 is formed in the rectangular portion 62 of the slider 60. In the state in which the cover 100 is assembled onto the slider 60, the assembly projection 118 passes through the assembly hole 124. The inner diameter of the assembly hole 124 is larger than the outer diameter of the assembly projection 118 when no particular external internal force is applied thereto. When no external internal force is applied to the assembly projection 118, the assembly projection can fit into the assembly hole 124 with play.

As shown in FIGS. 5 through 7, thick portions 126 which reduce the inner diameter of the through hole 120 are formed in the vicinity of the end portion of the assembly projection 118 which is opposite the end portion at which the connection portion with the projecting piece 112 is provided.

Inside the peripheral wall 104, an open portion 128 is formed in the bottom portion 102. Through the open portion 128, a button (not shown) is guided by the outer circumference of the cylindrical body 70 and slidably passes along the cylindrical body 70 in an axial direction therof.

A lever piece 130 is disposed inside the cover 100. The lever piece 130 includes a pair of power point portions 132 (see FIG. 1) which are disposed so as to sandwich the cylindrical body 70, and an action point portion 134 which is connected to both power point portions 132. The power point portions 132 are disposed between the button and the rectangular portion 62 of the slider 60, and are pressed by the button when the button moves toward the rectangular portion 62.

A part of the action point portion 134 is disposed inside the step portion 78. A semi-circular notch 136 (see FIG. 1) which can fit around the large diameter portion 84 of the pin 82 is formed in the action point portion 134. The part of the action point portion 134 that is disposed inside the step portion 78 is disposed between the bottom of the step portion 78 and the flange portion 88. The lever piece 130 is formed such that when the above power point portions 132 are displaced by pressure from the button, the lever piece 130 pivots about a connection portion between the power point portions 132 and the action point portion 134, and the action point portion 134 raises the flange portion 88 in a direction of separating the flange portion 88 from the rectangular portion 62.

An anchor cylinder 138 serving as an "anchor portion" is formed at the side of the open portion 128. The anchor cylinder 138 is formed in such a manner that the anchor cylinder 138 is co-axial with the through hole 80 and the pin 82 in the state in which the cover 100 is assembled onto the slider 60. The anchor cylinder 138 enters a compression coil spring 140 from one end portion in the axial direction thereof.

The inner diameter of the compression coil spring 140, when regarded as a cylinder, is slightly larger than the outer diameter of the anchor cylinder 138. The inner diameter of the compression coil spring 140 is considerably larger than the outer diameter of the small diameter portion 86 of the pin 82, and is considerably smaller than the outer diameter of the flange portion 88.

Another axial direction end portion of the compression coil spring 140 is a restriction ring 142 which serves as a "restriction portion", which is curved in a ring-shaped configuration having a smaller diameter than other portions of the compression coil spring 140. The inner diameter of the restriction ring 142 is slightly larger than the outer diameter of the small diameter portion 86 of the pin 82. The restriction ring 142 is formed coaxially with the other portions of the compression coil spring 140. The small diameter portion 86 of the pin 82 enters into the compression coil spring 140.

Next, of assembly steps of the present device 10 for adjusting the height of the shoulder anchor, assembly of the cover 100 onto the slider 60 and assembly of the sheet 30 onto the rail body 14 will be explained. Also, operation and advantages of assembly of the present device 10 for adjusting the height of the shoulder anchor will be explained.

Explanation of Assembly of Cover 100 onto Slider 60

Prior to assembly of the cover 100 onto the slider 60, firstly, as shown in FIG. 5, a part (that is, a portion where the notch 136 is formed) of the action point portion 134 of the lever piece 130 is disposed in the step portion 78 and the large diameter portion 84 of the pin 82 is passed through the notch 136 of the action point portion 134 and the through-hole 80. Next, the other axial direction end portion of the compression coil spring 140, that is, the restriction ring 142, is fitted onto the small diameter portion 86 of the pin 82. Further, members such as the button (not shown in the drawings) and the like to be disposed inside the cover 100 are disposed at predetermined positions.

Figure 8:
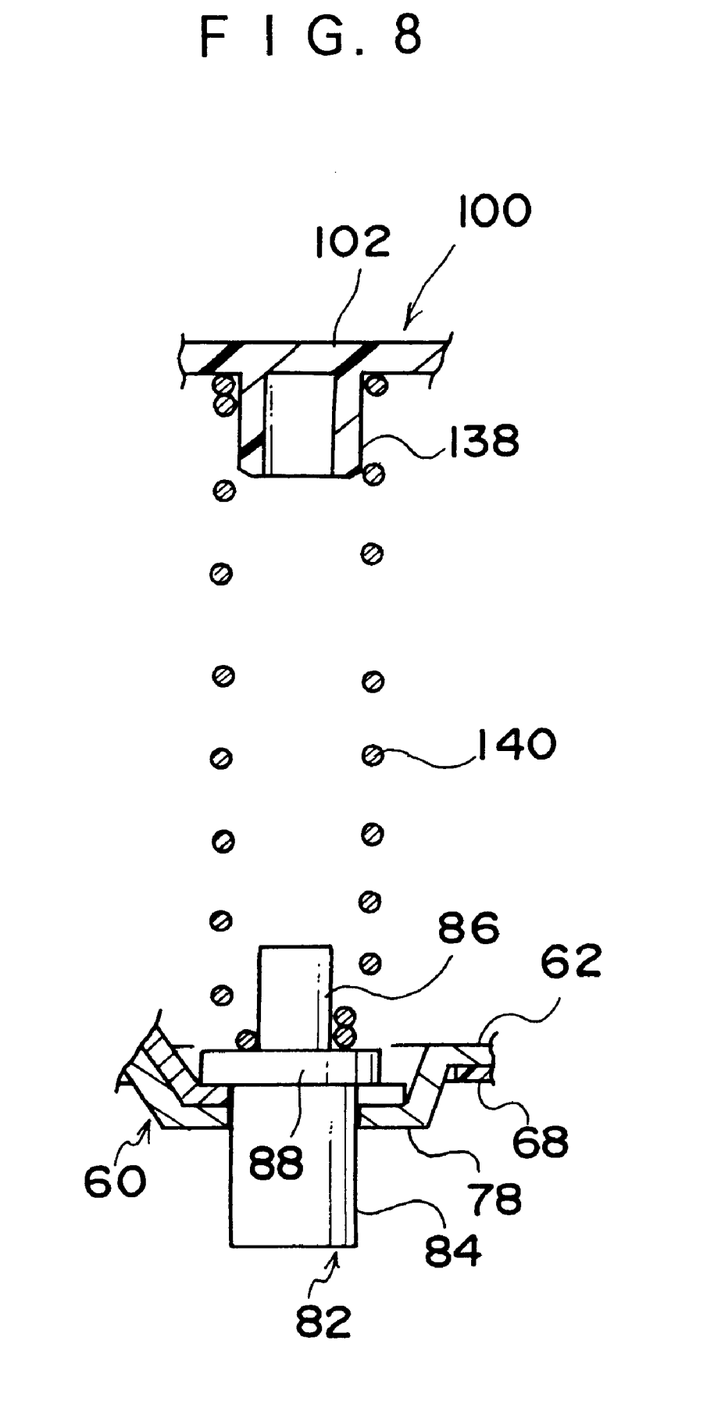
FIG. 8 is an enlarged sectional view showing details of a relationship between a compression coil spring and pins.

In a state in which disposition of each of the members is completed, the cover 100 is disposed in such a manner that the anchor cylinder 138 enters the compression coil spring 140 from the one axial direction end thereof (see FIG. 8 for detail). As shown in FIG. 6, the engaging hook 106 is engaged by sandwiching a part of the one longitudinal direction end portion of the rectangular portion 62. Furthermore, at this time, the assembly projection 118 fits into the assembly hole 124 of the rectangular portion 62. Because the outer diameter of the assembly projection 118 is sufficiently smaller than the inner diameter of the assembly hole 124 in the current state, the assembly projection 118 fits with play such that the cover 100 may be freely detached from the slider 60.

Next, in this state, as shown in FIG. 7, an external force having at least a predetermined strength is applied to the pin 116 formed on the projecting piece 112, toward the hole portion 114. By application of the external force, the connection portion between the pin 116 and the projecting piece 112 is broken, the pin 116 is mechanically separated from the projecting piece 112, and the pin 116 is pressed into the hole portion 114 by the external force.

When the pin 116 that is being pressed into the through hole 120 through the hole portion 114 reaches a portion of the assembly projection 118 where the thick portions 126 are formed, the inner diameter of the through hole 120 is smaller thereat with the result that the pin 116 presses the thick portions 126 to the outside in radial directions of the pin 116.

The assembly projection 118, to which pressure is applied from the pin 116, distorts so as to widen the slits 122. As a consequence, the diameter of the assembly projection 118 is enlarged. As a result of this enlargement in the diameter of the assembly projection 118, the assembly projection 118 presses against the inner circumference of the assembly hole 124 in which the assembly projection 118 was previously fit with play. Friction between the inner circumference of the assembly hole 124 and the outer circumference of the assembly projection 118 increases, thereby preventing the assembly projection 118 from pulling out of the assembly hole 124. Thus, the assembly of the cover 100 onto the slider 60 is completed.

Conventionally, a pin for heat weld caulking was projectedly formed from the bottom of the cover, the pin passed through the assembly hole, and the pin was heat welded and caulked to the rail body. In such a case, labor efficiency was poor because time was required for heat welding and for cooling after completion of the heat welding. However, for the present device 10 for adjusting shoulder anchor height, as described above, assembly is basically completed simply by pressing the pin 116 to pass through the assembly hole 124 and the assembly projection 118. Thus, labor efficiency can be improved. Moreover, the work of pressing the pin 116 to pass through the assembly hole 124 and the assembly projection 118 is simple enough that the work can be automated. Furthermore, because the assembly projection and the assembly hole were heated at the time of heat welding, followed by cooling of the assembly projection and the assembly hole, selection of a synthetic resin material for the cover was severely restricted, which hindered material cost reduction. However, as described above, heating and cooling operations are not required in the assembly of the cover 100 in the present device 10 for adjusting shoulder anchor height. As a consequence, selection of the synthetic resin material used for the cover 100 is less restricted (basically, only the mechanical strength needs to be satisfactory), material cost can be reduced, and the device 10 for adjusting shoulder anchor height can be manufactured at a lower cost.

Explanation of the Assembly Step of the Sheet 30 onto the Guide Rail 12

At the time of assembling the sheet 30 onto the guide rail 12, firstly, portions of the rail body 14 adjacent to the lock holes 22 are sandwiched between the sheet main body 32 and the anchor pieces 38 by the peripheral walls 36 of the sheet 30 being passed into the lock holes 22 diagonally from the rail body 14 longitudinal direction other end.

After the peripheral walls 36 have passed through the corresponding lock holes 22 and the portions of the rail body 14 which are adjacent to the lock holes 22 have been sandwiched between the sheet main body 32 and the anchor pieces 38, the peripheral wall 54 passes through the assembly hole 26. When the peripheral wall 54 is passing through the assembly hole 26, firstly, the engaging hook 56 formed on the peripheral wall 54 passes through the assembly hole 26. The engaging hook 56 projects outward from the peripheral wall 54 at a wide portion of the engaging hook 56. Therefore, the engaging hook 56 passes through the assembly hole 26 while being flexed (elastically deformed) toward the width direction inside or toward the inside in the direction of the radius of curvature of the curved portion. When the engaging hook 56 has completely passed through the assembly hole 22, the engaging hook 56 is restored to an original configuration thereof by elastic force thereof. In the restored state the wide portion of the engaging hook 56 is located outside the assembly hole 26 in the width direction or the radial direction, and the engaging hook 56 comes into contact with the surface of the rail body 14 on the side opposite to the side with which the sheet main body 32 comes into contact. Thus, pulling out of the engaging hook 56 via the assembly hole 26 is prevented and detachment of the sheet 30 from the rail body 14 is prevented.

Conventionally, a pin for heat welding and caulking was projectedly formed from the sheet main body, the pin was passed through a through-hole formed in the rail body and the pin was heat welded and caulked to the rail body. However, in this case, because time was required for heat welding and for cooling after the completion of the heat welding, labor efficiency was poor. However, with the present device 10 for adjusting shoulder anchor height, assembly is basically completed simply by passing the engaging hooks 56 and the peripheral wall 54 through the assembly hole 26. Thus, labor efficiency is improved. Moreover, because the work of passing the engaging hook 56 and the peripheral wall 54 through the assembly hole 26 is extremely simple, the work can be automated. Furthermore, because the engaging hook and the peripheral wall were heated at the time of heat welding and cooled thereafter, selection of a synthetic resin material for the sheet was severely restricted, which hindered material cost reduction. As described above, with the present device 10 for adjusting shoulder anchor height, heating and cooling are not required in the assembly of the sheet 30. As a consequence, selection of the synthetic resin material used in the sheet 30 is less restricted (basically, only mechanical strength needs to be satisfied), and material cost can be reduced with the result that the device 10 for adjusting shoulder anchor height can be manufactured at a lower cost.

Advantages and Operation of the Embodiment

Next, advantages and operation of the present device 10 for adjusting shoulder anchor height, which has been assembled through assembly steps including the assembly steps described above, will be explained.

The guide rail 12, with the slider 60 and the shoulder anchor and the like attached, is secured with a bolt or the like in the vicinity of the upper end portion of the center pillar of the vehicle such that the one longitudinal direction end of the guide rail 12 is substantially directed toward a lower portion of the vehicle. In this state, the slider 60 is such that the grip portions 66 thereof are engaged with the rail portions 18 of the rail body 14 with the result that displacement of the rail body 14 in the width direction and the thickness direction (that is, substantially in the forward and backward directions of the vehicle and substantially in the right and left directions thereof) is limited, and the slider 60 can principally be slid in the longitudinal direction along the rail body 14 (that is, substantially along the vertical direction of the vehicle).

Because the main body of the device 10 for adjusting shoulder anchor height and the guide rail 12 are fundamentally formed of iron or the like, direct rubbing of the main body between the device 10 and the guide rail 12 and direct impacts between the device 10 and the guide rail 12, resulting from vibrations or the like of the vehicle, generate metallic friction sounds and metallic collision sounds. However, as described above, because the slider 60 is provided with a plate 68 formed of synthetic resin material, direct contact between the metallic portion of the main body of the device 10 for adjusting shoulder anchor height and the metallic portion of the guide rail 12 is fundamentally prevented. As a consequence, the aforementioned metallic friction sounds and metallic collision sounds are not generated, with the result that quietness at a time of sliding of the slider 60 and at a time of running of the vehicle can be improved.

Further, because the pin 82 located inside the cover 100 is urged by the compression coil spring 140, the pin 82 is pressed against the rail body 14 with a force corresponding to the urging force of the compression spring 140. However, because the sheet 30 formed of synthetic resin material is disposed on the rail body 14, the pin 82 and the rail body 14 do not come into direct contact with each other. As a consequence, metallic friction sounds generated by rubbing between the pin 82 and the rail body 14 at the time of sliding of the slider 60 can be prevented, with the result that quietness can be improved in this respect as well.

Furthermore, because the pin 82 is urged by the compression coil spring 140 as described above, the positioning of the through-hole 80 of the slider 60 in correspondence to one of the lock holes 22 of the rail body 14 allows the pin 82 to be entered the lock hole 22 by the urging force of the compression coil spring 140. The pin 82, when it has entered the lock hole 22, collides with the bottom wall 40. However, because the bottom wall 40 is a part of the sheet 30 and is formed of synthetic resin material, the collision of the pin 82 with the bottom wall 40 does not lead to generation of a collision sound that would be generated by a collision of metals. Consequently, quietness can be improved in this respect as well.

The pin 82 which has entered the lock hole 22 tends to be moved toward the one longitudinal direction end of the guide rail 12, that is, to the lower portion of the vehicle, by the action of the pin's own weight, the weight of structural members of the slider 60 acting on the pin 82 via the rectangular portion 62 and the weight of the shoulder anchor and the like. However, lowering of the pin 82 is limited by the peripheral wall 36 at contact of the pin 82 with the curved portion of the peripheral wall 36 (when the configuration of the peripheral wall 36 is regarded as a substantially U-shaped configuration, the bottom portion of the U shape). Consequently, the sliding of the slider in the downward direction is restricted at a position corresponding to the location where the lowering of the pin 82 is limited. As described above, a plurality of lock holes 22 are formed along the longitudinal direction of the slider 60. Thus, the height of the slider 60, that is, the position of the shoulder anchor attached to the slider 60, can be adjusted simply by causing the pin 82 to enter one of the lock holes 22 (that is, by appropriately selecting the lock hole 22 into which the pin 82 is to enter).

Release of the sliding restriction of the slider 60 in the downward direction simply requires pulling out of the pin 82 from the lock hole 22. As described above, the action point portion 134 of the lever piece 130 is disposed between the flange portion 88 formed on the pin 82 and the step portion 78 of the rectangular portion 62. The action point portion 134 is caused to raise the flange portion 88 by pressing of the power point portion 132 of the lever piece 130 by the button (not shown in the drawings) with the result that the pin 82 is moved against the urging force of the compression coil spring 140. As a consequence, the pin 82 is pulled out from the lock hole 22, and the slider 60 can be slid in the downward direction.

In a case where the compression coil spring which urges the pin is a simple cylindrical spring, the inner diameter of the compression coil spring is considerably larger than the outer diameter of the small diameter portion of the pin, and the compression coil spring can be displaced in a radial direction with respect to the small diameter portion (a diametric direction) Thus, the compression coil spring is displaced in the radial direction (the diametric direction) at the time when the flange portion presses and compresses the compression coil spring, with the result that the axial direction of the compression coil spring may be inclined with respect to the axial direction of the pin. In such a case, at the time of compression of the compression coil spring, an axial direction intermediate portion of the compression coil spring comes into contact with a distal end portion of the anchor cylinder provided on the cover. Thus, a portion of the compression coil spring at the anchor cylinder side of the intermediate portion is insufficiently compressed, and the pin cannot be sufficiently moved as a result. Consequently, in such a state, the pin cannot be completely pulled out of the lock hole by the pressing of the button, and the slider cannot be smoothly slid.

Conventionally, the above problem was solved by the compression force on the compression coil spring acting uniformly in directions transverse to the axis thereof. In such a case, position adjustment of the compression coil spring at a time of assembly of the compression coil spring was extremely delicate, and labor efficiency was extremely poor, which hindered automation of this assembly step. Moreover, even when a position adjustment was made, the compression coil spring could be displaced in some cases at times of vibration of the running vehicle and at times of sliding of the slider.

On the other hand, with the present device 10 for adjusting shoulder anchor height, at the other end portion (that is, the end portion at the small diameter portion 86) of the compression coil spring 140, the restriction ring 142 has an inner diameter which is slightly larger than the outer diameter of the small diameter portion 86, with the result that displacement of the compression coil spring 140 in the radial direction (the diametric direction) with respect to the small diameter portion 86 is substantially limited. As a consequence, when the compression coil spring 140 is subjected to pressure from the flange portion 88, the compression coil spring 140 is always compressed along the axial direction of the small diameter portion 86 and the anchor cylinder 138, with the result that the axial direction intermediate portion of the compression coil spring 140 does not come into contact with the distal end portion of the anchor cylinder 138 provided on the cover 100. Thus, the above problem dose not occur.

Further, the small diameter portion 86 can simply be passed through the restriction ring 142. Because no delicate position adjustment is required, labor efficiency can be improved. The work of passing the small diameter portion 86 through the restriction ring 142 is fundamentally sufficiently easy that the work can be automated.

Even in the state in which the pin 82 has entered the lock hole 22, sliding of the slider 60 in an upward direction of the vehicle 60 is not as restricted as the sliding of the slider in the downward direction. That is, because the peripheral wall 36 is located below the pin 82 which has entered the lock hole 22, the lowering of the pin 82 is restricted by the peripheral wall 36. However, above the pin 82 is the guide wall 42. Because the surface of the guide wall 42 is an inclined surface inside the pin-housing portion 44, when the pin 82 is raised, a distal end portion of the pin 82 rides onto the guide wall 42. When the pin 82 is further raised in this state, the pin 82 rises toward the other longitudinal direction end of the guide rail 12 while being moved toward the bottom portion 102 of the cover 100 against the urging force of the compression coil spring 140 by pressing force from the guide wall 42. Hence, when the pin 82 is raised, a resistance force, depending on the urging force acting from the compression coil spring 140, can be felt but it is possible to raise the pin 82 without operation of the button.

Here, the distal end portion of the pin 82 rides onto the guide wall 42. When the pin 82 is further raised in this state, the urging force of the compression coil spring 140 acts on the guide wall 42 via the pin 82 and the guide wall 42 is pressed in the urging direction. As the guide wall 42 is pressed in the urging direction, friction between the distal end portion of the pin 82 and the guide wall 42 stretches the guide wall 42 toward the sheet main body 32 and works to deform the guide wall 42. If the guide wall 42 is deformed by this force, there is a problem in that the pin 82 is trapped at a deformed portion of the guide wall 42, and the pin 82 ceases to be guidable in a smooth manner by the guide wall 42.

In order to solve this problem, conventionally, a tongue-shaped support piece extended from an inner circumference portion of the lock hole to support the guide wall and thereby prevented deformation of the guide wall. However, the guiderail, in which the lock holes were formed, was made of metal. Normally, the guide rail was molded by means of "stamping" and "press bending" in press molding. Thus, in a case where such a support piece was formed in a structure, structure of a mold for molding became complicated. And when precision in the size of the support piece was poor, a gap was generated between the support piece and the guide wall so that the guide wall was not reliably supported. As a consequence, the above problem could not be completely solved.

On the other hand, with the present device 10 for adjusting shoulder anchor height, a rib section 46 is formed on the guide wall 42 such that the strength of the guide wall 42 is supplemented. Consequently, deformation of the guide wall 42 is prevented and the pin 82 can be smoothly guided by the guide wall 42. Moreover, the rib section 46 is integral with the guide wall 42 and no gap occurs between the guide wall 42 and the rib section 46, unlike the support piece described above. In this respect, deformation of the guide wall 42 can be reliably prevented. Furthermore, of the rib sections 46, one end of each vertical rib 48 comes into contact with an end portion of the contact piece 24 formed on the rail body 14. Thus, even when the guide wall 42 is being pulled on, a pulling force is absorbed by the contact piece 24 via the vertical ribs 48. Consequently, this pulling force does not deform the guide wall 42. In addition, prevention of deformation of the guide wall 42 by the contact piece 24 via the vertical ribs 48 can prevent detachment of the guide wall 42, the peripheral wall 36 and the bottom wall 40. Also, detachment of the sheet 30 from the guide rail 12 can be prevented. In other words, with the device 10 for adjusting shoulder anchor height, a structure is adopted that prevents detachment of the sheet 30 not only with the engaging hooks 56 but also with the vertical ribs 48 (the structure is such that not only is detachment of the sheet 30 at a part thereof prevented but also detachment of the sheet 30 over a relatively large portion is prevented), and the assembly of the sheet 30 in the guide rail 12 is strong. From a different view point, the engaging hooks 56 do not need to be so strong, because detachment of the sheet 30 is prevented by the vertical ribs 48. Consequently, a material with relatively low strength can be adopted as the synthetic resin material for the sheet 30, and the cost thereof can be reduced.

The same advantages and operation can be obtained if the vertical ribs 48 are allowed to come into contact with the inner circumference portion of the lock hole 22, without formation of the contact piece 24.

In view of improving the strength of the guide wall 42, an increase in the thickness of the guide wall 42 can suffice, and adoption of such structure is satisfactory. However, when an attempt is made to partially form such a thick portion in a resin-molded product such as the sheet 30 or the like, a so-called "recess" is formed in the thick portion. If such a "recess" is generated, the pin is trapped at a recessed portion with the result that a problem occurs in that the pin ceases to be smoothly guided by the guide wall. On the other hand, with the present device 10 for adjusting shoulder anchor height, a rib section 46 including square rod-shaped vertical ribs 48 and horizontal ribs 50 is adopted as a structure for reinforcing the strength of the guide wall 42, and no "recesses" or the like are generated at the guide wall 42 at the time of formation. Consequently, in this respect, the pin 82 can be smoothly guided by the guide wall 42.

As described above, in the present invention, assembly of components becomes easy, and the manufacturing steps can be automated.

What is claimed is:

1. A device for adjusting shoulder anchor height of a seat belt assembly in a vehicle, the device comprising:
    a guide member securable to a vehicle having a seat belt assembly with a shoulder anchor;
    a slider adapted for connection to the shoulder anchor, the slider being engaged with the guide member and slidable therealong;
    an engaging member that fixes a position of the slider and the guide member relative to one another;
    a buffer member having a main body, the main body being mounted on the guide member, and having an inclined surface with a lower side, the buffer member being interposed between the engaging member and the guide member; and
    a reinforcing rib integrally provided at the main body on the lower side of the inclined surface wherein said inclined surface guides the engaging member in a direction opposite to an engaging direction of the engaging member when the slider moves.

2. The device according to claim 1, wherein the main body includes a recess portion which receives the engaging member thereinside for engagement, and the inclined surface portion is continuous with the recess portion.

3. The device according to claim 2, wherein the engaging member is attached to the slider, and the main body is attached to the guide member.

4. The device according to claim 3, wherein the guide member includes at least one lock hole which receives the recess portion and the inclined surface portion of the main body.

5. The device according to claim 4, wherein the reinforcing rib enables partial contact of the buffer member with an inner periphery of the lock hole.

6. The device according to claim 2, wherein the engaging member is biased against a bottom surface of the recess portion of the main body by a spring.

7. The device according to claim 6, wherein the recess portion has an engaging piece for the guide member.

8. The device according to claim 4, wherein the inclined surface portion has a plurality of reinforcing ribs acting as reinforcing protrusions on the lower side of the inclined surface portion, and said ribs intersect one another.

9. The device according to claim 8, wherein the reinforcing ribs are orthogonal to the main body.

10. A device for adjusting shoulder anchor height of a seat belt assembly in a vehicle, the device comprising:

a guide member securable to a vehicle having a seat belt assembly with a shoulder anchor;

a slider adapted for connection to the shoulder anchor, the slider being engaged with the guide member and slidable therealong;

an engaging member attached to the slider which engages with the guide member to thereby fix a position of the slider and the guide member relative to one another;

a buffer member having a main body attached to the guide member and interposed between the engaging member and the guide member, the main body having an inclined surface portion with a lower side;

reinforcing ribs integrally provided at the main body on the lower side of the inclined surface wherein said inclined surface guides the engaging member in a direction opposite to an engaging direction of the engaging member when the slider moves; and a recess portion provided continuously from the inclined surface of the main body for allowing the engaging member to enter thereinside for providing engagement, the engaging member being urged toward a bottom surface of the recess portion of the main body by a spring.

11. The device according to claim 10, wherein the guide member includes at least one lock hole which receives the recess portion and the inclined surface portion of the main body.

12. The device according to claim 11, wherein the lock hole includes an inner circumference, part of which inner circumference contacts at least part of the reinforcing rib.

13. The device according to claim 10, wherein the main body is formed from a synthetic resin material, and has a plurality of cylindrical recess portions which are comprised of the inclined surface portion and the recess portion, and are provided along the longitudinal direction of the guide member.

14. The device according to claim 13, wherein the main body in the vicinity of a projective portion has an engaging piece for the guide member.

15. The device according to claim 10, wherein the reinforcing ribs are provided in a plurality and intersect one another.

16. The device according to claim 15, wherein the reinforcing ribs are orthogonal to the main body.

17. A device for adjusting shoulder anchor height of a seat belt assembly in a vehicle, the device comprising:

a slider on which is mounted a shoulder anchor;

a guide member for guiding the shoulder anchor;

a lock pin in the slider, which lock pin engages with a lock hole which is formed along the longitudinal direction of the guide member;

a buffer member which is disposed at the inner perimeter of the lock hole;

a recess portion and an inclined surface portion which are provided on the buffer member; and a reinforcing section which is integrally provided with the buffer member on a lower surface of the inclined surface portion.

18. The device according to claim 17, wherein the reinforcing section comprises ribs which project from the buffer member.

19. The device according to claim 18, wherein at least some of the ribs intersect one another.

20. The device according to claim 17, wherein there are a plurality of hole portions in said buffer member and a plurality of lock holes, each hole portion being received in a lock hole, with the lock holes extending along the guide member.

* * * * *